(12) United States Patent
Rothschild

(10) Patent No.: US 9,747,261 B2
(45) Date of Patent: *Aug. 29, 2017

(54) SYSTEM AND METHOD OF EMBEDDING SYMBOLOGY IN ALPHABETIC LETTERS AND THEN LINKING THE LETTERS TO A SITE OR SITES ON THE GLOBAL COMPUTER NETWORK

(71) Applicant: REAGAN INVENTIONS, LLC, Sunny Isles Beach, FL (US)

(72) Inventor: Leigh M Rothschild, Sunny Isles Beach, FL (US)

(*) Notice: Subject to any disclaimer, the term of this patent is extended or adjusted under 35 U.S.C. 154(b) by 34 days.

This patent is subject to a terminal disclaimer.

(21) Appl. No.: 14/480,609

(22) Filed: Sep. 8, 2014

(65) Prior Publication Data

US 2015/0067461 A1    Mar. 5, 2015

Related U.S. Application Data

(63) Continuation of application No. 13/313,099, filed on Dec. 7, 2011, now Pat. No. 8,832,542, which is a continuation of application No. 12/387,245, filed on Apr. 30, 2009, now Pat. No. 8,151,180.

(60) Provisional application No. 61/126,398, filed on May 2, 2008.

(51) Int. Cl.
*G06F 17/22* (2006.01)
*G06F 17/30* (2006.01)

(52) U.S. Cl.
CPC .... *G06F 17/2235* (2013.01); *G06F 17/30882* (2013.01); *G06F 17/30899* (2013.01)

(58) Field of Classification Search
CPC .......... G06F 17/2235; G06F 17/30899; G06F 17/30882
See application file for complete search history.

(56) References Cited

U.S. PATENT DOCUMENTS

| | | |
|---|---|---|
| 6,665,490 B2 | 12/2003 | Copperman et al. |
| 6,697,056 B1 | 2/2004 | Bergelson et al. |
| 6,836,555 B2 | 12/2004 | Ericson et al. |
| 7,102,765 B1 * | 9/2006 | Abi-Saleh .......... G09B 19/0053 358/1.13 |
| 7,176,896 B1 | 2/2007 | Fahraeus et al. |
| 7,289,110 B2 | 10/2007 | Hansson |

(Continued)

*Primary Examiner* — Thu Hyunh
(74) *Attorney, Agent, or Firm* — Eugenio J. Torres-Oyola; Victor Rodriguez-Reyes; Rafael Rodriguez-Muriel

(57) ABSTRACT

A system and method of embedding symbology in alphabetic letters and then linking the letter to a site or sites on the global computer network, i.e., the Internet, are provided. The system and method provide for capturing an image of at least one character fixed in a medium; determining at least one letter of an alphabet corresponding to the at least one character; determining a numerical value for the determined at least one letter; looking up in a database a hyperlink corresponding to the numerical value; and presenting the hyperlink on a display device. The system and method further provide determining at least one marking within the at least one letter; and determining a location for the at least one marking within the at least one letter, wherein the combination of the at least one marking and the location for the at least one marking corresponds to the numerical value.

25 Claims, 4 Drawing Sheets

(56) References Cited

U.S. PATENT DOCUMENTS

| | | |
|---|---|---|
| 8,151,180 B2* | 4/2012 | Rothschild ........ G06F 17/30899 |
| | | 715/206 |
| 8,832,542 B2* | 9/2014 | Rothschild ........ G06F 17/30899 |
| | | 715/205 |
| 2001/0024193 A1 | 9/2001 | Fahraeus |
| 2002/0107888 A1 | 8/2002 | Chiu et al. |
| 2002/0152236 A1 | 10/2002 | Incertis-Carro |
| 2003/0115167 A1* | 6/2003 | Sharif .................. G06F 3/0489 |
| 2004/0199871 A1* | 10/2004 | Lee ...................... G06F 3/0489 |
| | | 715/205 |
| 2004/0210826 A1 | 10/2004 | Najork |
| 2005/0060644 A1 | 3/2005 | Patterson |
| 2005/0195221 A1* | 9/2005 | Berger .................. G06F 3/0481 |
| | | 345/660 |
| 2005/0268214 A1 | 12/2005 | Lu |
| 2008/0069340 A1 | 3/2008 | Vaughn |
| 2009/0033987 A1 | 2/2009 | Lapstun et al. |
| 2009/0078475 A1 | 3/2009 | Ericson et al. |
| 2009/0182527 A1 | 7/2009 | Wiebe et al. |

\* cited by examiner

SYSTEM AND METHOD OF EMBEDDING SYMBOLOGY IN ALPHABETIC LETTERS AND THEN LINKING THE LETTERS TO A SITE OR SITES ON THE GLOBAL COMPUTER NETWORK

PRIORITY

The present application claims priority under the laws of the US including 35 USC 120 and is a continuation patent application of U.S. patent application Ser. No. 13/313,099 filed Dec. 7, 2011, the contents of which is hereby incorporated by reference in its entirety, which in turn is a continuation patent application of U.S. patent application Ser. No. 12/387,245 filed on Apr. 30, 2009, the contents of which is hereby incorporated by reference in its entirety, which in turn claims priority to U.S. Provisional Patent App. No. 61/126,398 filed on May 2, 2008, the contents of which is hereby incorporated by reference in its entirety.

BACKGROUND

Field

A system and method is provided to allow a user to encode alphabet letters so that the letters will link a user to a site or sites on the Global Computer Network. By example, a user could give someone the word Churchill and then the receiving user could decode the word Churchill and the decoding would lead the user to a specific website on Winston Churchill.

Description of the Related Art

Alphabetic letters were invented a long time ago and form the basis for communication among humans. However, these letters do not allow a human to decode for anything beyond words. The present object of this disclosure is to allow a user to decode the letters in a word to obtain the word and also to allow a machine logic based system to decode the letter or letters in a word to obtain the address of a specific location (website) on the World Wide Web.

This decoding of letters will allow letters to thus have two or more meanings, the first being the formation of a word and the second the location of digital information on and within the World Wide Web. As an example, if the word Churchill were coded, the human mind would decode the letters in this word to represent the entire word Churchill and perhaps that word would evoke various images in various human minds, including the image or memory of the former British Prime Minister. In the present disclosure, the word Churchill would not only decode to the word Churchill, but when the letters are read by a machine readable application, the machine would direct the user to a specific and pre-selected site on the Global Computer Network (web) that would contain information on Mr. Winston Churchill.

SUMMARY

A system and method of embedding symbology in alphabetic letters and then linking the letter to a site or sites on the global computer network, i.e., the Internet, are provided. The system and method provide for capturing an image of at least one character fixed in a medium; determining at least one letter of an alphabet corresponding to the at least one character; determining a numerical value for the determined at least one letter; looking up in a database a hyperlink corresponding to the numerical value; and presenting the hyperlink on a display device.

According to an aspect of the present disclosure, the system and method further provide determining at least one marking within the at least one letter; and determining a location for the at least one marking within the at least one letter, wherein the combination of the at least one marking and the location for the at least one marking corresponds to the numerical value.

In one aspect of the present disclosure, the image includes a plurality of characters and the determining a numerical value further comprises summing the numerical value for each of the plurality of characters.

In a further aspect, the at least one marking is a color.

In another aspect, the at least one marking is a hatch mark, at least one dot, a line, a bolded element or a combination thereof.

In yet another aspect, the at least one character is a letter, a symbol, a syllabogram or logogram.

According to another aspect of the present disclosure, the system and method provide for segmenting the at least one character into at least two segments; and applying the at least one marking to at least one of the at least two segments at different locations.

BRIEF DESCRIPTION OF THE DRAWINGS

The above and other aspects, features, and advantages of the disclosure will become more apparent in the light of the following detailed description when taken in conjunction with the accompanying drawings in which.

DETAILED DESCRIPTION

Figure 1:
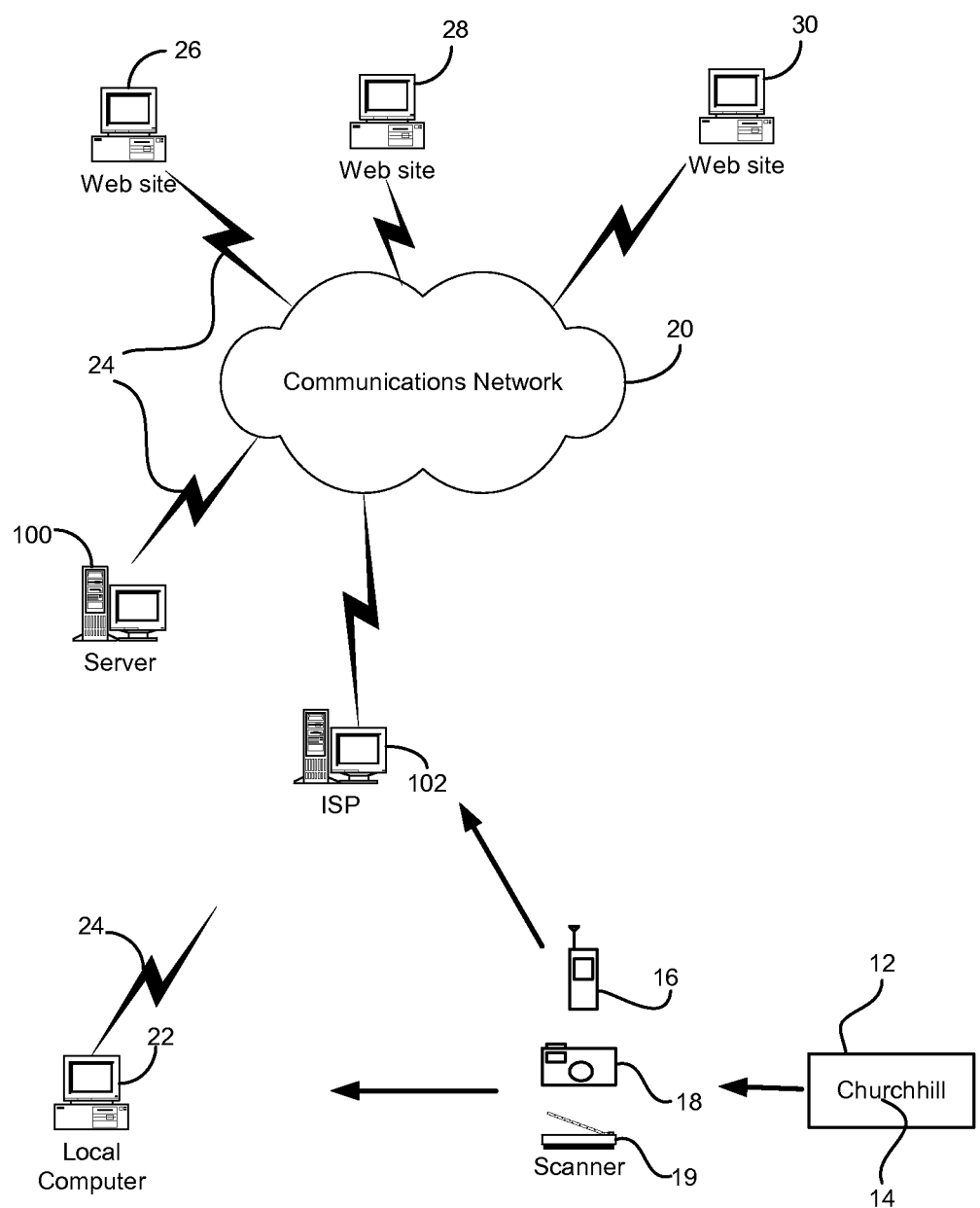
FIG. 1 is an overall flow diagram of a system for providing a hyperlink on a network using symbology embedded in letters of an alphabet in accordance with an embodiment of the present disclosure.

Preferred embodiments of the disclosure will be described hereinbelow with reference to the accompanying drawings. In the following description, well-known functions or constructions are not described in detail to avoid obscuring the disclosure.

A system and method of embedding symbology in alphabetic letters and then linking the letter to a site or sites on the global computer network, i.e., the Internet, are provided. A letter of an alphabet (not limited by language, e.g., could be English, French, Russian, Chinese, etc.) is formed in a fashion that markings could be applied to the letter. The markings could be a hatch mark, a dot, a color indication, a line, a bolding, or any combination therein. These markings would be placed at specific locations on the letter. By example, a hatch mark could be placed on the letter C in the middle of the letter and another mark at the top of the letter.

A machine readable application such as Optical Character Recognition (OCR), or a photographic image of the letter, would record the letter in digital form. The letter would then be analyzed by computer processing power to look for the marking in the letter and the specific location of the markings. This information would be sent to decoding software module. The combination of the physical location on the letter and the marking would allow the decoding module to decode each letter into a resultant numerical value by using an algorithmic decoding function.

By example, if the letter E has a marking on the top portion of the letter, that top portion of the marking would decode to a number. In this example, the location of the letter E could be premapped to 24 locations that pixel by pixel define the location on the letter where the marking could be placed. The markings could be of various types, for instance, a dot, a bold line, a half bold line, a full bold line, a line that goes diagonal, a line that goes horizontal, a blue line, a red line, etc.

For every variation of the marking, a number would be defined. In this example, a full line would correspond to the number one and a half line marking would correspond to the number 2. In this example (but this is not meant to provide limitation), there could be 24 types of markings. Thus in the instant exemplar there would be $24^{24}$ permutations of possible numerical values defining the letter E.

The decoding module software would now decode the letter to come up with a numerical value corresponding to that letter. This number would then be submitted via the Global Computer Network to a database that could be remotely located or locally located on the user's computer (databases such as Oracle or Microsoft SQL) and the database would use standard computer processing power and standard database algorithms to find which prestored web location hyperlink corresponds to the submitted number.

Once the web location is determined and transmitted from the remote or local location of the user's local processor, then the user will be directed to that location. In the instant example, the letter E would decode to the number 1,000,445, which would be sent to a local or remote database. The transmission of this information could be through a mobile device or a desktop device. The transmission could be through Cellular, Satellite, Infrared, Bluetooth, Wan, Lan, Wifi, or any other communications channel now known or known in the future. The database would then look up 1,000,445 and find that it corresponds to the prestored website en.wikipedia.org./wiki/Winston_Churchill. The user would then have access to that information at the website.

Note that this system and method disclosure applies to decoding the letters whether from a mobile device using standard OCR technology or image recognition technology, or using desktop device(s) including scanners, image recognition software, etc.

Please note that the above example represents one embodiment of this disclosure and that the final decoding of the alphabetic letters into a number that corresponds to the resultant website could be accomplished by decoding one or more alphabetic letters.

Referring to FIG. 1, a system for embedding symbology in alphabetic letters and then linking the letter to a site or sites on the global computer network is illustrated. A substrate or medium 12 carries a word 14 including at least one character. The at least one character may be a letter of any known alphabet. The substrate 12 may be a newspaper, advertisement at a point-of-sale, an exhibition display, etc. An image of the at least one character is captured by a suitable device such as a mobile terminal 16 (e.g., a mobile phone or personal digital assistant), a digital camera 18, a scanner 20 and sent to a server 100 over a network 20 either directly by the devices 16, 18, 20 or via a local computer 22.

The server 100 determines a letter of an alphabet corresponding to the at least one character by accessing a database containing a plurality of alphabet databases. The server 100 then determines a numerical value for the determined letter.

The server 100 then uses the determined numerical value to lookup a hyperlink corresponding to the numerical value in a second database. Based on the numerical value determined from the letter, the server 100 retrieves a hyperlink from the database and presents the hyperlink to a user on an appropriate display device, e.g., a computer monitor, a mobile phone display, etc. The hyperlink may be a link to a web site, a document stored on another server, etc.

Figure 2:
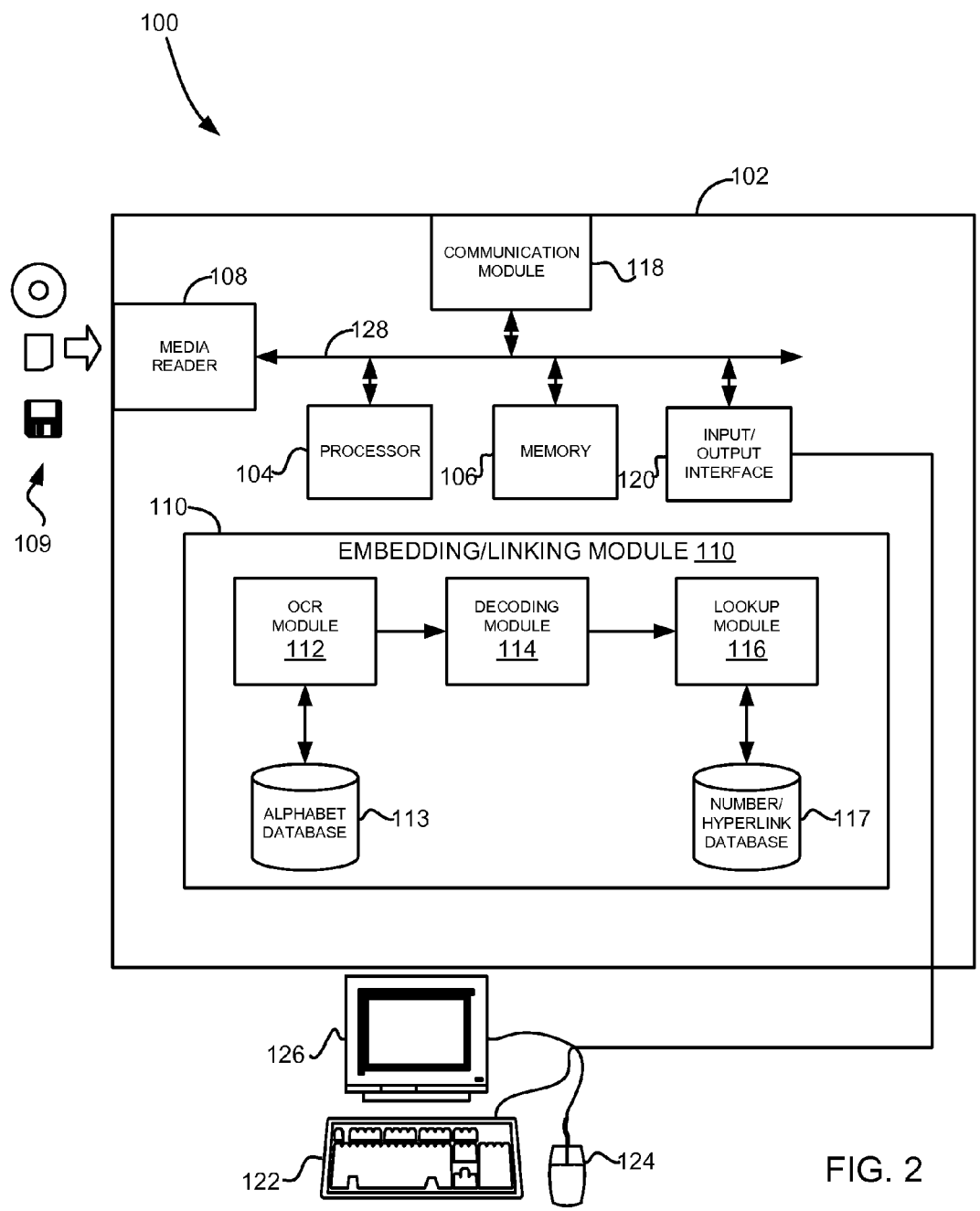
FIG. 2 is an exemplary apparatus for providing a hyperlink on a network using symbology embedded in letters of an alphabet in accordance with an embodiment of the present disclosure.

Referring to FIG. 2, a server or apparatus 100 for embedding symbology in alphabetic letters and then linking the letter to a site or sites on the global computer network is illustrated. The system includes a computer assembly 102 for embedding and decoding symbology in letters with a computer processor 104. The computer assembly 102 will also contain a digital memory storage device or memory 106 that may be in the form of a removable or fixed hard disk device, or may be in the form of writeable memory, or may be in some other form hereto known or created in the future. The computer assembly 102 will also includes a media reader/writer 108 for reading from and writing to external storage media 109. In one embodiment of the present disclosure, the media reader 108 is a optical reader/writer (OR) that will read and process various optical media including but not limited to DVDs, CDs, CD-ROMs, and other types of optical media that may be currently available or available in the future. The optical reader/writer OR may also be able to write and store digital data. In another embodiment, the media reader 108 is a memory card reader/writer (MCR). The memory card reader (MCR) will read various removable memory including but not limited to CompactFlash, SD (Secure Digital) memory, MultiMediaCard (MMC), Memory Stick, SmartMedia and other memory currently existing or created in the future. The memory card reader (MCR) may also be able to write and store digital data.

The computer assembly 102 contains computer instructional code that is operated by the computer processor 104. This code functions to create a embedding/linking module 110 for embedding the symbology into a letter, where the symbology equates to a numerical value, and then links the symbology/numerical value to a hyperlink. The embedding/linking module 110 includes an OCR module 112 for receiving an image containing the at least one character and determining a letter of an alphabet corresponding to the at least one character. The OCR module 112 performs a recognition algorithm or function on the character and accesses an alphabet database 113 to determine the what the letter is and what alphabet it is from. The embedding/linking module 110 furthers includes a decoding module 114 for analyzing the determined letter and determining a numerical value for the letter. As will be describes in more detail below, the decoding module 114 receives the determined letter and searches the letter for predetermined markings or patterns. Based on the markings or patterns, the decoding module 114 determines a numerical value for the letter. In one embodiment, the numerical value is based not only on the markings or patterns in the letter but also on where the markings or patterns are located on the letter. For example, the same or identical markings may equate to different values depending on where the markings are located on the letter.

It is further to be appreciated that the decoding module 114 can determine a numerical value for a complete word including a plurality of letters where each letter will have a value and the values for each letter will be summed into a single numerical value.

The embedding/linking module 110 will also include a lookup module 116 for receiving the determined numerical value and using the numerical value to lookup in a database 117 a corresponding hyperlink. The number/hyperlink database 117 includes a plurality of records associating a numerical value to a predetermined hyperlink, which when activated will direct a user to a variety of content. It is to be appreciated that the linked content may be any currently available content including but not limited to an audio file, video file, multimedia file, application file, web site or web page or any content to be developed in the future.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by a machine, e.g., computer assembly 102, comprising any suitable architecture such as a personal computer, a workstation or server. Preferably, the computer assembly 102 is implemented on a computer platform having hardware such as one or more central processing units (CPU), a random access memory (RAM), a read only memory (ROM) and input/output (I/O) interface(s) 120 such as a keyboard 122, cursor control device 124 (e.g., a mouse or joystick) and display device 126, e.g., a monitor. A system bus 128 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform of the machine by various interfaces and bus structures, such a parallel port, serial port or universal serial bus (USB). One such peripheral device may include a communication module 118, e.g., a modem, satellite relay, wireless connection, etc., for enabling communications from the computer assembly 102 to various servers. Other peripheral devices may include additional storage devices, a printer and a scanner.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The computer assembly 102 may operate in a networked environment using logical connections to one or more remote computers, e.g., server 26,28,30. The remote computer may be a personal computer, a server, a router, a network PC, a peer device or other common network node, and typically includes many or all of the elements described above relative to the machine. It is to be appreciated that the network 20 may be a local area network (LAN), wide area network (WAN), the Internet or any known network that couples a plurality of computers to enable various modes of communication via network messages. The computer assembly 102 may communicate to the server 26,28,30 and network 20 via any known communication link 24, for example, dial-up, hardwired, cable, DSL, satellite, cellular, PCS, wireless transmission (e.g., 802.11a/b/g, etc.), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

Figure 3:
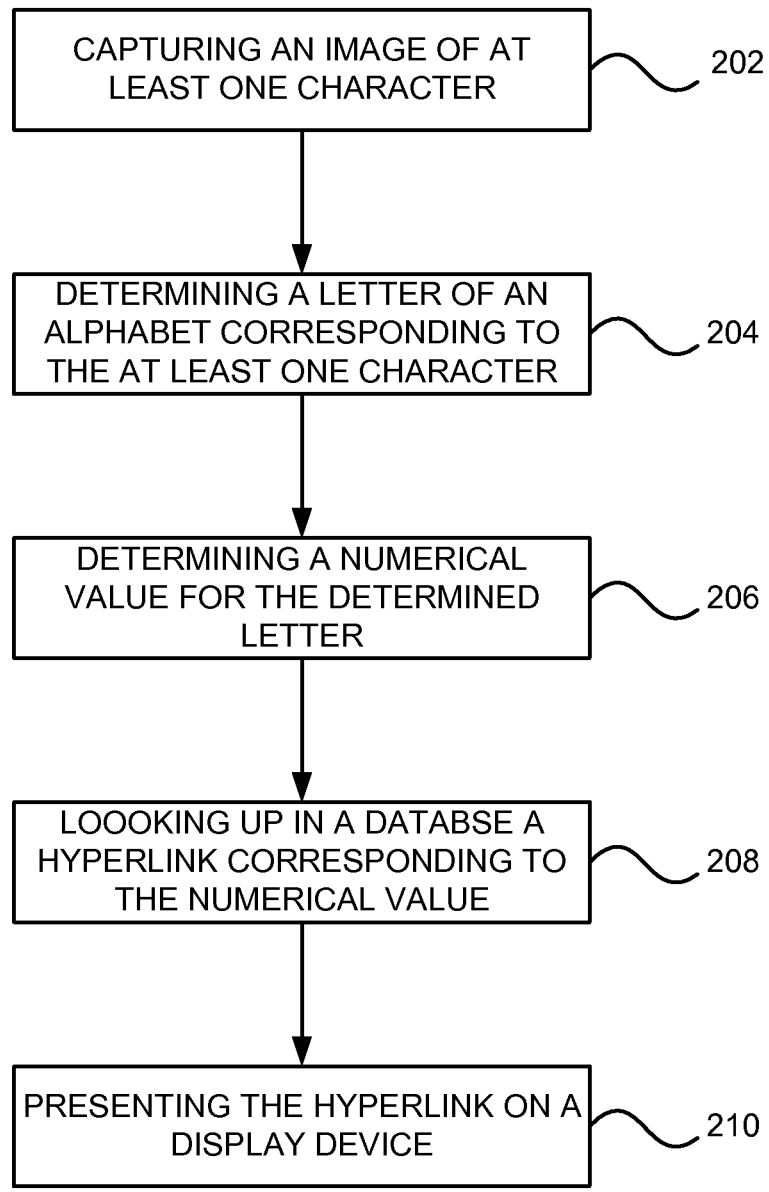
FIG. 3 is a flow chart illustrating a method for providing a hyperlink on a network using symbology embedded in letters of an alphabet.
Figure 4:
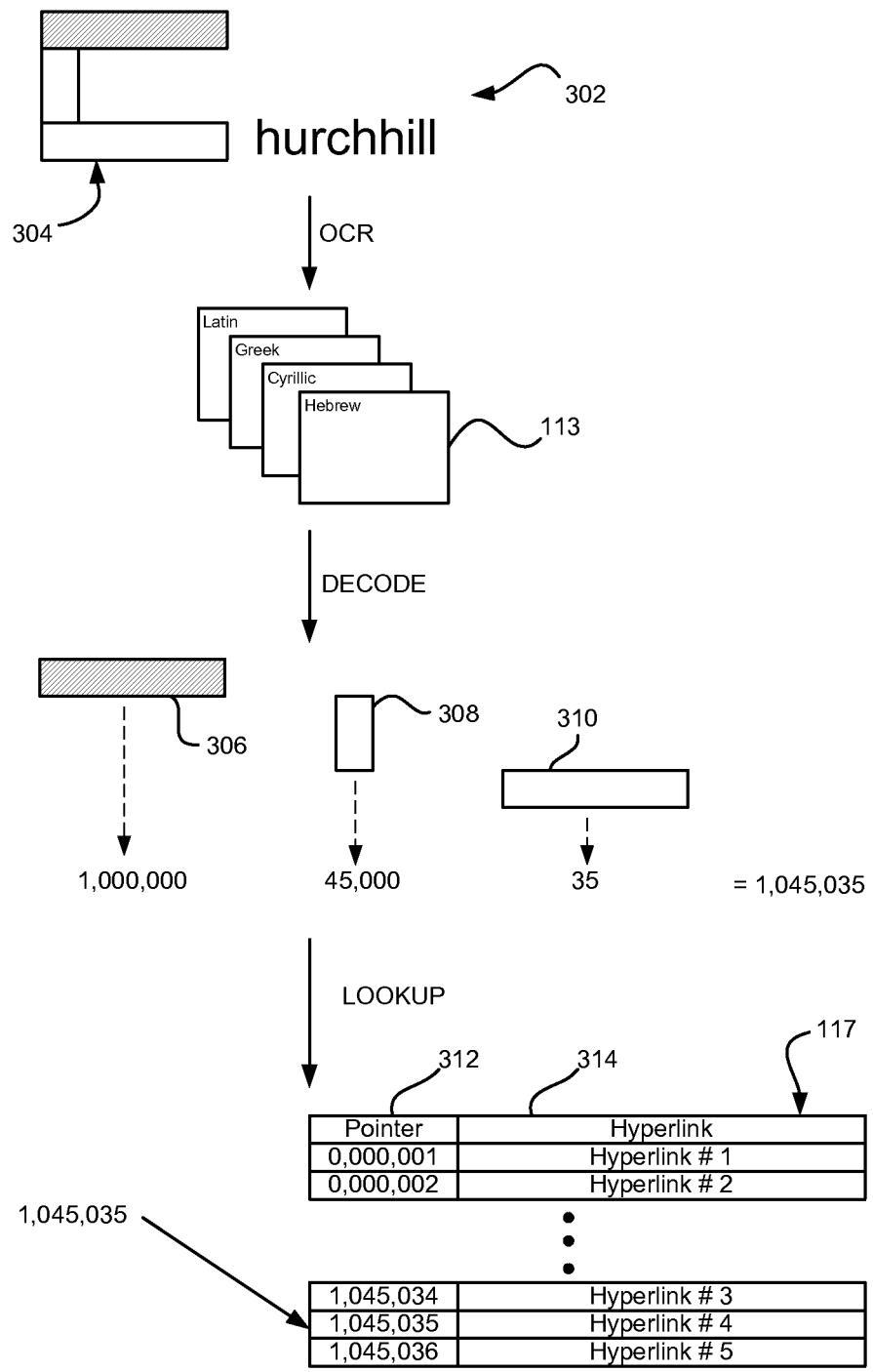
FIG. 4 illustrates an example of decoding a letter into a numerical value and using the numerical value as a lookup to determine a corresponding hyperlink in accordance with an embodiment of the present disclosure.

With reference to FIGURES, a method of the present disclosure will now be described, where FIG. 3 is a flow chart illustrating a method for providing a hyperlink on a network using symbology embedded in letters of an alphabet and FIG. 4 illustrates an example of decoding a letter into a numerical value and using the numerical value as a lookup to determine a corresponding hyperlink.

Initially, in step 202, an image of at least one character fixed in a medium is captured via any one of a known plurality of devices. In the example shown in FIG. 4, the word "Churchill" 302 is captured. As can be seen in FIG. 4, only the character or letter "C" 304 has markings applied to it. For simplicity, the following discussion will reference only one letter with markings or patterns applied to it. However, it is to be appreciated that each letter of the word may include markings and/or patterns applied to it.

The image 302 can be captured by a mobile phone 16 with a camera, a digital camera 18 where the image can be transferred to a user local computer, a scanner 19 where a user scans another image or paper containing the word or by any known or to be developed capture device. The image 302 is then transferred to server 100. In one embodiment, the mobile device 16 will transfer the image 302 from that device to the network 20 and subsequently the server 100. In other embodiments, the image 302 will be transferred to a user's local computer 22 and then to the server 100 via intermediary server 102 such as an Internet Service Provider (ISP) 102.

The server 100 receives the image 302 via the communication module 118 and transmits the image to the OCR module 112. The OCR module 112 determines a letter of an alphabet corresponding to the character 304 (step 204). The OCR module 112 accesses an alphabet database 113 including a plurality of different alphabets to find the closest match to the character and determine the corresponding letter.

Once the letter is determined, the determined letter is transmitted to the decoding module 114 to determine a numerical value for the letter (step 206). The decoding module 114 analyzes the letter to determine if any markings or patterns exist on within the letter. A single particular marking in the letter will equate to a particular numerical value. In one embodiment, the numerical value of the marking will also depend on its location within the letter. Referring to the example of FIG. 4, the letter "C" includes a first portion 306, a second portion 308 and a third portion 310. Each portion includes different markings which equate to a different numerical value. For example, the first portion 306 includes hatching which equates to a value of 1,000,000. The second portion 308 includes dots which equates to a value of 45,000. The third portion 310 includes no markings which equates to a value of 35. The total numerical value of the letter "C" 304 is 1,045,035. It is to be appreciated that if the second portion 308 included hatching it would equate to a value other than 1,000,000 because of it location, for example, 55,000.

The total numerical value (in this example 1,045,035) is then employed to lookup a hyperlink in database 117 corresponding to the numerical value (step 208). The number/hyperlink database 117 includes a plurality of records with each record including a numerical value field 312 and a corresponding hyperlink field 314. In the example of FIG. 4, the numerical value, i.e., 1,045,035, is employed by the lookup module 116 to retrieve hyperlink #4.

The retrieved hyperlink is then presented to the user on an appropriate display device (step 210). For example, if the image 302 is transmitted by a mobile phone 16, the hyperlink is displayed on a screen or display of the mobile phone. In another example, if the image 302 is transmitted from the user's local computer 24, the hyperlink is presented on a monitor of the computer. In one embodiment, the hyperlink is automatically activated and the resultant content is presented to the user. For example, if the hyperlink is to a web site, the corresponding web site will be presented to the user. In another example, if the hyperlink is linked to a pdf file, the pdf file will be presented.

One of the features of the present disclosure is that the letters can be from any language such as English, Chinese, Russian, etc. and can be any from any known or to be developed alphabet such as Latin, Greek, Cyrillic, Hebrew, Arabic, etc. Furthermore, the character can be a symbol, a syllabogram (i.e., an element which denotes a syllable), a logogram (an element which denotes a word or phrase) or the like.

Furthermore, a hardware device may be employed to scan an alphabetic letter and obtain a numerical value from that letter, and the hardware device may be a mobile device. In this embodiment, the hardware device will only transmit the numerical value and not the entire image. Thus, the subject system and method may employ a mobile device for transmitting the numerical code decoded from the alphabetic letters to a remote server. Also, the subject invention may include the feature of looking up the numerical code that has been transmitted and then associating that code with a site or sites on the Global Computer Network.

Another feature is that the decoded letters may be made by color, or by markings including dots, lines, and/or other marking types such as placing marking in different directions within the letter (i.e., horizontal or vertical).

In the subject system and method, mapping alphabetic letters and assigning a valuation to each selected location on the alphabetic letter is followed by marking the letter at any selected location or a multitude of locations.

Another feature is decoding the value of the alphabetic letter by taking the value of the letter at the individual point where the letter is marked and then the value assigned to the individual marking at the selected point the letter is marked and by taking the first value and using it as the base integer value and the second value and using it as the exponential power (e.g. 100 to the $83^{rd}$ power or $100^{83}$) and then deriving a value from that algorithm.

Still another feature of the present disclosure is decoding the value of the alphabetic letter by taking the value assigned to the individual marking at the selected point the letter is marked and then the assigned value at the individual point where the letter is marked and by taking the first value and using it as the base integer value and the second value and using it as the exponential power (e.g., 83 to the $100^{th}$ power or $83^{100}$) and then deriving a value from that algorithm.

The present disclosure also provides for applying the markings to the letters or characters. In one embodiment, the system and method provides for segmenting the at least one character into at least two segments and applying the at least one marking to at least one of the at least two segments at different locations.

While this disclosure has been shown and described with reference to certain preferred embodiments thereof, it will be understood by those skilled in the art that various changes in form and detail may be made therein without departing from the spirit and scope of disclosure of the appended claims.

What is claimed is:

1. A method for improving functionality of machine-based image processing and decoding for providing a hyperlink on a network, the method comprising:
   capturing an image of at least one visible character fixed in a medium;
   determining a letter of an alphabet corresponding to the at least one visible character;
   identifying, within the captured image, at least one symbology applied within the determined letter,
   wherein the at least one symbology forms a visible portion of the at least one visible character;
   determining a type of the identified at least one symbology and a location for the identified at least one symbology within the letter;
   determining a numerical value for the identified at least one symbology based on the determined letter, determined type of the at least one symbology and location of the identified at least one symbology within the determined letter;
   looking up in a database a hyperlink corresponding to the numerical value;
   and
   presenting the hyperlink on a display device.

2. The method as in claim 1, wherein the image includes a plurality of characters and the determining a numerical value further comprises summing the numerical value for each of the plurality of characters.

3. The method as in claim 1, further comprising activating the hyperlink and displaying a web site on the display device.

4. The method as in claim 1, wherein the at least one symbology is a color.

5. The method as in claim 1, wherein the at least one symbology is a hatch mark, at least one dot, a line, a bolded element or a combination thereof.

6. The method as in claim 1, further comprising:
   segmenting the at least one visible character into at least two segments; and
   applying the at least one symbology to at least one of the at least two segments at different locations.

7. The method as in claim 1, wherein the at least one visible character is a letter, a symbol, a syllabogram or logogram.

8. The method as in claim 1, wherein the identifying step further includes:
   segmenting the at least one visible character into at least two segments; and
   determining a symbology in each of the at least two segments.

9. The method as in claim 8, wherein the determining the numerical value further comprises summing the numerical values determined for the symbology s in each of the at least two segments.

10. The method as in claim 1, wherein the at least one symbology and the at least one visible character are fixed in the same medium.

11. An apparatus for improving functionality of machine-based image processing and decoding for providing a hyperlink on a network comprising:
a communication link that receives a transmitted image of at least one visible character fixed in a medium;
a processor coupled to a memory for storing a control program, the control program renders the apparatus to function as:
a first module for determining at least one letter of an alphabet corresponding to the at least one visible character and identifying, within the transmitted image, at least one symbology applied within the letter, wherein the at least one symbology forms a visible portion of the at least one visible character;
a decoding module for determining a type of the identified at least one symbology and a location for the identified at least one symbology within the letter and determining a numerical value for the identified at least one symbology based on the determined letter, determined type of the at least one symbology and location of the identified at least one symbology within the determined letter; and
a lookup module for looking up in a database a hyperlink corresponding to the numerical value and presenting the hyperlink on a display device.

12. The apparatus as in claim 11, wherein the image includes a plurality of characters and the decoding module sums the numerical value for each of the plurality of characters.

13. The apparatus as in claim 11, wherein the lookup module is further adapted for activating the hyperlink and displaying a web site on the display device.

14. The apparatus as in claim 11, wherein the at least one symbology is a color.

15. The apparatus as in claim 11, wherein the at least one symbology is a hatch mark, at least one dot, a line, a bolded element or a combination thereof.

16. The apparatus as in claim 11, wherein the decoding module is further adapted for:
segmenting the at least one visible character into at least two segments; and
applying the at least one symbology to at least one of the at least two segments at different locations.

17. The apparatus as in claim 11, wherein the at least one visible character is a letter, a symbol, a syllabogram or logogram.

18. The apparatus as in claim 11, wherein the decoding module is further adapted for segmenting the at least one visible character into at least two segments and determining a symbology in each of the at least two segments.

19. The apparatus as in claim 18, wherein the decoding module is further adapted for summing the numerical values determined for the symbology s in each of the at least two segments.

20. The apparatus as in claim 11, wherein the at least one symbology and the at least one visible character are fixed in the same medium.

21. A system for improving functionality of machine-based image processing and decoding to provide a hyperlink over a network comprising:
a first mobile device for capturing an image of at least one visible character fixed in a medium, the first mobile device including a first communication link for transmitting over a network the captured image to a server; and
the server comprising:
a second communication link for receiving the captured image;
a processor coupled to a memory for storing a control program, the control program renders the system to function as:
a first module for determining at least one letter of an alphabet corresponding to the at least one visible character and identifying, within the received image, at least one symbology applied within the letter, wherein the at least one symbology forms a visible portion of the at least one visible character;
a decoding module for determining a type of the identified at least one symbology and a location for the identified at least one symbology within the letter and determining a numerical value for the identified at least one symbology based on the determined letter, determined type of the at least one symbology and location of the identified at least one symbology within the determined letter; and
a lookup module for looking up in a database a hyperlink corresponding to the numerical value,
wherein the second communication link of the server transmits the hyperlink to the first mobile device;
whereby the system determines both the at least one letter and the hyperlink from the captured image of the at least one visible character.

22. The system as in claim 21, wherein the first mobile device is a personal digital assistant.

23. The system as in claim 21, wherein the first mobile device is a mobile phone.

24. The system as in claim 21, wherein the first mobile device is a personal computer.

25. The system as in claim 21, wherein the at least one symbology and the at least one visible character are fixed in the same medium.

* * * * *